United States Patent
Nisan et al.

(10) Patent No.: US 10,003,404 B2
(45) Date of Patent: Jun. 19, 2018

(54) DETERMINING EFFICIENCY OF AN OPTICAL SIGNAL SOURCE IN DISTRIBUTED COMMUNICATION SYSTEMS

(71) Applicant: Corning Optical Communications Wireless Ltd, Airport City (IL)

(72) Inventors: Ofer Nisan, Netanya (IL); Rami Reuven, Rishon Letzion (IL); Pinhas Yehuda Rosenfelder, Beit-Shemesh (IL); Ofer Shinaar, Gedera (IL)

(73) Assignee: Corning Optical Communications Wireless Ltd, Airport City (IL)

( * ) Notice: Subject to any disclaimer, the term of this patent is extended or adjusted under 35 U.S.C. 154(b) by 106 days.

(21) Appl. No.: 15/059,398

(22) Filed: Mar. 3, 2016

(65) Prior Publication Data

US 2016/0191165 A1 Jun. 30, 2016

Related U.S. Application Data

(63) Continuation of application No. PCT/IL2014/050844, filed on Sep. 22, 2014.
(Continued)

(51) Int. Cl.
*H04B 10/27* (2013.01)
*H04B 10/272* (2013.01)
(Continued)

(52) U.S. Cl.
CPC .......... *H04B 10/27* (2013.01); *H04B 10/272* (2013.01); *H04B 10/50* (2013.01); *H04B 10/503* (2013.01); *H04B 10/60* (2013.01)

(58) Field of Classification Search
None
See application file for complete search history.

(56) References Cited

U.S. PATENT DOCUMENTS 5,019,769 A * 5/1991 Levinson .............. H01S 5/0014
372/31
5,677,779 A * 10/1997 Oda ....................... H04B 10/40
398/137

(Continued)

FOREIGN PATENT DOCUMENTS

CN 101222119 A 7/2008

OTHER PUBLICATIONS

Patent Cooperation Treaty International Search Report for PCT/IL2014/050844, dated Apr. 7, 2015, 3 pages.
(Continued)

*Primary Examiner* — Tesfaldet Bocure
(74) *Attorney, Agent, or Firm* — C. Keith Montgomery (57) ABSTRACT

Components, systems, and methods for determining efficiency of an optical signal source in distributed communication systems are disclosed. Environmentally induced variations in the performance of optical sources used to convert electrical signals to optical signals (such as laser diodes) at the transmitters within the system can be evaluated in real time. Steps can be taken to compensate for these variations. The efficiency of the laser diode can be measured and provided to receivers in the distributed communication system. The receiver may use information related to the slope efficiency measurement to adjust the gain of the receiving amplifiers to provide desired adjustments to the gain. Thus, the receivers in the remote units (RU) receive information about the slope efficiency of the laser diodes at the head end equipment (HEE) and the HEE receives information about the slope efficiency of the laser diodes at the RU.

19 Claims, 7 Drawing Sheets

Related U.S. Application Data (60) Provisional application No. 61/884,454, filed on Sep. 30, 2013.

(51) Int. Cl.
*H04B 10/50* (2013.01)
*H04B 10/60* (2013.01)

(56) References Cited

U.S. PATENT DOCUMENTS

| | | | | |
|---|---|---|---|---|
| 6,512,617 | B1* | 1/2003 | Tanji | H04B 10/40 398/137 |
| 6,629,638 | B1* | 10/2003 | Sanchez | G01R 31/002 235/454 |
| 6,928,094 | B2 | 8/2005 | Asuri et al. | |
| 7,065,302 | B1* | 6/2006 | Jelks | H04B 10/505 398/183 |
| 7,519,093 | B2 | 4/2009 | Asuri et al. | |
| 7,639,952 | B2* | 12/2009 | Nelson | H04B 10/564 398/136 |
| 8,594,506 | B1* | 11/2013 | Farmer | H04B 10/25754 398/115 |
| 9,089,084 | B2* | 7/2015 | Ukai | H05K 13/00 |
| 2005/0078722 | A1* | 4/2005 | Wu | H01S 5/0014 372/38.01 |
| 2005/0185684 | A1* | 8/2005 | Stewart | H04B 10/503 372/29.02 |
| 2005/0286575 | A1* | 12/2005 | Hattori | H01S 5/06213 372/29.02 |
| 2006/0216040 | A1 | 9/2006 | Nelson | |
| 2007/0071046 | A1* | 3/2007 | Quek | H01S 5/06832 372/38.02 |
| 2008/0166094 | A1 | 7/2008 | Bookbinder et al. | |
| 2009/0169163 | A1 | 7/2009 | Abbott, III et al. | |
| 2011/0268446 | A1 | 11/2011 | Cune et al. | |
| 2014/0270806 | A1* | 9/2014 | Valencia | H04B 10/504 398/182 |
| 2015/0282105 | A1* | 10/2015 | Harel | H04W 52/52 370/329 |

OTHER PUBLICATIONS

International Preliminary Report on Patentability for PCT/IL2014/050844, dated Apr. 14, 2016, 8 pages.

\* cited by examiner

DETERMINING EFFICIENCY OF AN OPTICAL SIGNAL SOURCE IN DISTRIBUTED COMMUNICATION SYSTEMS

PRIORITY APPLICATIONS

This application is a continuation of International Application No. PCT/IL2014/050844 filed on Sep. 22, 2014 which claims the benefit of priority to U.S. Provisional Application No. 61/884,454, filed on Sep. 30, 2013, both applications being incorporated herein by reference.

BACKGROUND

The technology of the disclosure generally relates to managing optical sources in distributed communication systems and more particularly to managing laser diodes.

Wireless communication is rapidly growing, with ever-increasing demands for high-speed mobile data communication. As an example, so-called "wireless fidelity" or "WiFi" systems and wireless local area networks (WLANs) are being deployed in many different types of areas (e.g., coffee shops, airports, libraries, etc.). Distributed communication systems (one type of which is a distributed antenna system) communicate with wireless devices called "clients," which must reside within the wireless range or "cell coverage area" to communicate with an access point device.

One approach to deploying a distributed antenna system (DAS) involves the use of radio frequency (RF) antenna coverage areas, also referred to as "antenna coverage areas." Antenna coverage areas typically have a radius in the range from a few meters up to twenty meters. Combining a number of access point devices creates an array of antenna coverage areas. Because the antenna coverage areas each cover small areas, there are typically only a few users (clients) per antenna coverage area. This arrangement allows for minimizing the amount of RF bandwidth shared among the wireless system users.

One type of DAS distributes RF communication signals over optical fibers. A DAS can include head end equipment (HEE) optically coupled to remote units (RUs) or remote antenna units (RAUs) having an antenna to provide antenna coverage areas. The RUs have RF transceivers coupled to one or more antennas to wirelessly transmit RF communication signals. The antennas in the RUs also receive RF signals from clients in the antenna coverage area which are sent over optical fiber to the HEE.

Optical signals are placed onto the optical fibers by laser diodes such as the QF9550CM1 Quantum Cascade Laser sold by THORLABS of Newton, N.J. The optical power of the laser diode is proportional to the electrical current that drives the laser diode. System designers expect the power received at the RUs to fall within a certain band, for example, 14 dBm to 17 dBm. To maintain the received power within the desired range, the overall gain of the system is estimated during system setup by injecting a known signal at the transmitter and measuring the signal at the receiver. The measured value is returned to the transmitter and an estimate of the overall gain is stored. Based on the overall gain of the system, the power level needed at the laser diode may be calculated. While such calibration provides a good first order estimate of the overall gain of the system, environmental factors may cause variations for which the calibration does not compensate. Accordingly, there remains a need to improve the model of the system and provide the appropriate gain.

No admission is made that any reference cited herein constitutes prior art. Applicant expressly reserves the right to challenge the accuracy and pertinency of any cited documents.

SUMMARY

Embodiments disclosed in the detailed description include components, systems, and methods for determining efficiency of an optical signal source in distributed communication systems. In embodiments disclosed herein, environmentally induced variations in the performance of optical sources used to convert electrical signals to optical signals (such as laser diodes) at the transmitters within the system can be evaluated in real time. Steps can be taken to compensate for these variations. In particular, the efficiency of the laser diode can be measured and provided to receivers in the distributed communication system. For example, the efficiency may be determined as a function of the slope of the diode's input current versus power output, i.e., gain. The receiver may use information related to the slope efficiency measurement to adjust the gain of the receiving amplifiers to provide desired adjustments to the gain. Thus, the receivers in the remote units (RU) receive information about the slope efficiency of the laser diodes at the head end equipment (HEE) and the HEE receives information about the slope efficiency of the laser diodes at the RU.

One embodiment of the disclosure relates to a distributed antenna system (DAS). The DAS includes head end equipment (HEE). The HEE includes a downlink transmitter comprising a downlink laser diode and an uplink receiver configured to receive signals from a plurality of remote units (RUs), and at least one optical fiber coupling the HEE to the plurality of RUs. Each RU includes one or more antennas configured to communicate wirelessly with one or more remote clients. Each RU also includes a downlink receiver communicatively coupled to the downlink transmitter through the optical fiber, and an uplink transmitter communicatively coupled to the uplink receiver through the optical fiber, wherein the uplink transmitter comprises an uplink laser diode. The DAS also includes a control system associated with one of the HEE or one of the plurality of RUs and configured to determine a slope efficiency of the respective laser diode and provide information related to the slope efficiency to the receiver associated with the respective laser diode.

An additional embodiment of the disclosure relates to a distributed communication system in which the HEE includes a downlink transmitter comprising a downlink laser diode. The HEE also includes an uplink receiver configured to receive signals from a plurality of RUs. The HEE also includes a control system configured to determine a slope efficiency of the downlink laser diode and provide information related to the slope efficiency to one of the plurality of RUs.

An additional embodiment relates to a distributed communication system having an RU configured to communicate wirelessly with one or more remote clients. The RU includes a downlink receiver configured to receive signals from HEE through at least one optical fiber, and an uplink transmitter communicatively coupled to an uplink receiver through the optical fiber, wherein the uplink transmitter comprises an uplink laser diode. The RU also includes a control system configured to determine a slope efficiency of the uplink laser diode and provide information related to the slope efficiency to the HEE.

An additional embodiment of the disclosure relates to a method of compensating for variations in laser diode performance in a distributed communication system. The method includes determining a slope efficiency of a transmitter's laser diode, providing information relating to the slope efficiency to a receiver in the distributed communication system, and adjusting a link gain at the receiver based on the information relating to the slope efficiency.

An additional embodiment of the disclosure relates to a non-transitory computer readable medium comprising software with instructions. The instructions include determining a slope efficiency of a transmitter's laser diode, providing information relating to the slope efficiency to a receiver in the distributed communication system, and adjusting a link gain at the receiver based on the information relating to the slope efficiency.

Additional features and advantages will be set forth in the detailed description which follows, and in part will be readily apparent to those skilled in the art from that description or recognized by practicing the embodiments as described herein, including the detailed description, the claims, as well as the appended drawings.

The foregoing general description and the following detailed description are merely exemplary, and are intended to provide an overview or framework to understand the nature and character of the claims. The drawings are included to provide a further understanding, and are incorporated in and constitute a part of this specification. The drawings illustrate one or more embodiment(s), and together with the description serve to explain principles and operation of the various embodiments.

DETAILED DESCRIPTION

While the concepts of the present disclosure are applicable to different types of distributed communication systems, an exemplary embodiment of a system for determining efficiency of an optical signal source is used in a distributed antenna system (DAS) and this exemplary embodiment is explored herein. Before discussing the efficiency determination processes of the present disclosure starting at FIG. 3, an exemplary DAS capable of distributing radio frequency (RF) communication signals to distributed or remote units (RUs) are first described with regard to FIGS. 1-2A. It should be appreciated that in an exemplary embodiment the RUs may contain antennas such that the RU is a remote antenna unit and may be referred to as a RAU.

Figure 1:
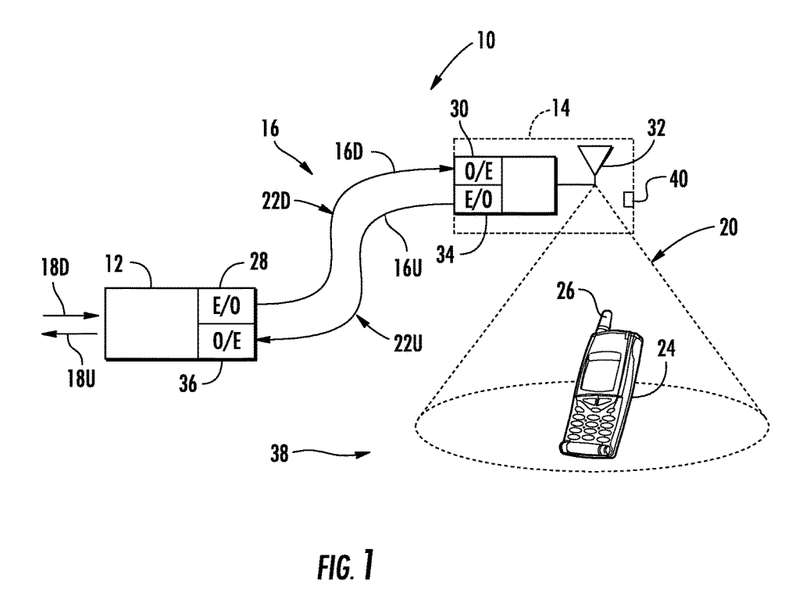
FIG. 1 is a schematic diagram of an exemplary distributed antenna system (DAS)
Figure 2A:
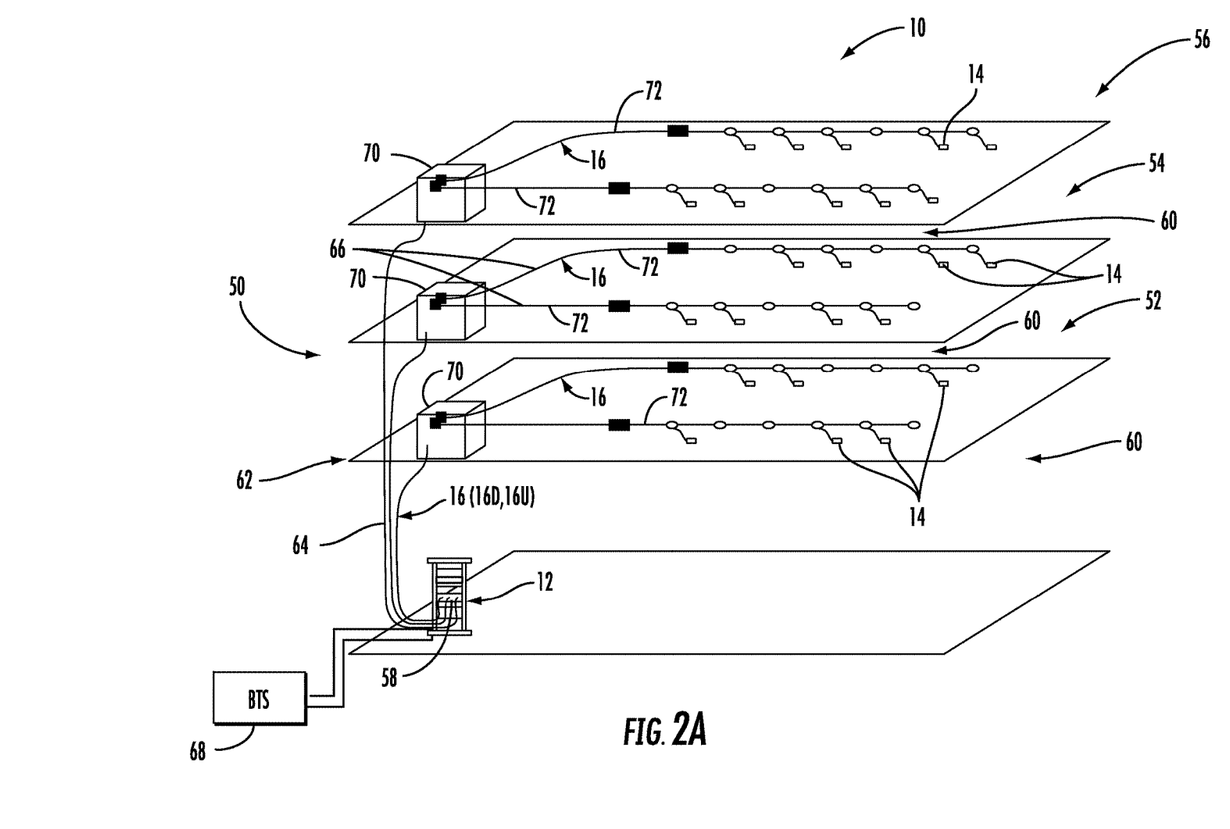
FIG. 2A is a partially schematic cut-away diagram of an exemplary building infrastructure in which the DAS in FIG. 1 can be employed.

In this regard, the DAS in FIGS. 1-2A can include transmitters located in the head end unit or the RU. Embodiments of optical signal source control systems in a distributed communication system, including the distributed antenna systems in FIGS. 1-2A, begin with FIG. 3. The DASs in FIGS. 1-2A discussed below include distribution of RF communication signals; however, the DAS are not limited to distribution of RF communication signals. Also note that while the DAS in FIGS. 1-2A discussed below include distribution of communication signals over optical fiber, these DAS are not limited to distribution strictly over optical fiber. Distribution mediums could also include, but are not limited to, hybrid optical/copper cables. Also, any combination can be employed that also involves optical fiber for portions of the DAS.

In this regard, FIG. 1 is a schematic diagram of an embodiment of a DAS. In this embodiment, the system is an optical fiber-based DAS 10. The DAS 10 is configured to create one or more antenna coverage areas for establishing communication with wireless client devices located in the RF range of the antenna coverage areas. The DAS 10 provides RF communication services (e.g., cellular services). In this embodiment, the DAS 10 includes head-end equipment (HEE) 12 such as a head-end unit (HEU), one or more RUs 14, and an optical fiber 16 that optically couples the HEE 12 to the RU 14. The RU 14 is a type of remote communication unit. In general, a remote communication unit can support wireless communication, wired communication, or both. The RU 14 can support wireless communication and may also support wired communication through wired service port 40. The HEE 12 is configured to receive communication over downlink electrical RF signals 18D from a source or sources, such as a network or carrier as examples, and provide such communication to the RU 14. The HEE 12 is also configured to return communication received from the RU 14, via uplink electrical RF signals 18U, back to the source or sources. In this regard in this embodiment, the optical fiber 16 includes at least one downlink optical fiber 16D to carry signals communicated from the HEE 12 to the RU 14 and at least one uplink optical fiber 16U to carry signals communicated from the RU 14 back to the HEE 12.

One downlink optical fiber 16D and one uplink optical fiber 16U could be provided to support multiple channels each using wave-division multiplexing (WDM), as discussed in U.S. patent application Ser. No. 12/892,424 entitled "Providing Digital Data Services in Optical Fiber-based Distributed Radio Frequency (RF) Communication Systems, And Related Components and Methods," incorporated herein by reference in its entirety. Other options for WDM and frequency-division multiplexing (FDM) are disclosed in U.S. patent application Ser. No. 12/892,424, any of which can be employed in any of the embodiments disclosed herein. Further, U.S. patent application Ser. No. 12/892,424 also discloses distributed digital data communication signals in a DAS which may also be distributed in the optical fiber-based DAS 10 either in conjunction with RF communication signals or not.

The optical fiber-based DAS 10 has an antenna coverage area 20 that can be disposed about the RU 14. The antenna coverage area 20 of the RU 14 forms an RF coverage area 38. The HEE 12 is adapted to perform or to facilitate any one of a number of Radio-over-Fiber (RoF) applications, such as RF identification (RFID), wireless local-area network (WLAN) communication, or cellular phone service. Shown within the antenna coverage area 20 is a client device 24 in the form of a mobile device as an example, which may be a cellular telephone as an example. The client device 24 can be any device that is capable of receiving RF communication signals. The client device 24 includes an antenna 26 (e.g., a wireless card) adapted to receive and/or send electromagnetic RF signals.

With continuing reference to FIG. 1, to communicate the electrical RF signals over the downlink optical fiber 16D to the RU 14, to in turn be communicated to the client device 24 in the antenna coverage area 20 formed by the RU 14, the HEE 12 includes a radio interface in the form of an electrical-to-optical (E/O) converter 28, such as a laser diode. The E/O converter 28 converts the downlink electrical RF signals 18D to downlink optical RF signals 22D to be communicated over the downlink optical fiber 16D. The RU 14 includes a receiver with an optical-to-electrical (O/E) converter 30, such as a photo diode, to convert received downlink optical RF signals 22D back to electrical RF signals to be communicated wirelessly through an antenna 32 of the RU 14 to client devices 24 located in the antenna coverage area 20.

Similarly, the antenna 32 is also configured to receive wireless RF communication from client devices 24 in the antenna coverage area 20. In this regard, the antenna 32 receives wireless RF communication from client devices 24 and communicates electrical RF signals representing the wireless RF communication to an E/O converter 34, such as a laser diode, in the RU 14. The E/O converter 34 converts the electrical RF signals into uplink optical RF signals 22U to be communicated over the uplink optical fiber 16U. A receiver with an O/E converter 36 provided in the HEE 12 converts the uplink optical RF signals 22U into uplink electrical RF signals, which can then be communicated as uplink electrical RF signals 18U back to a network or other source.

For both the HEE 12 and the RU 14, the power received at the O/E converter 30, 36 should be between 14 dBm and 17 dBm. Typically the E/O converters 28, 34 are driven near saturation in an attempt to achieve the desired received power. However, loss in the optical path or other loss may cause the overall gain of the system to be such that the desired power levels cannot be achieved. Accordingly, the receivers may include one or more chained amplifiers that boost the incoming signal to the desired levels. More information on the receivers is provided below with reference to FIG. 4.

To provide further exemplary illustration of how a distributed antenna system can be deployed indoors, FIG. 2A is provided. FIG. 2A is a partially schematic cut-away diagram of a building infrastructure 50 employing an optical fiber-based DAS. The system may be the optical fiber-based DAS 10 of FIG. 1. The building infrastructure 50 generally represents any type of building in which the optical fiber-based DAS 10 can be deployed. As previously discussed with regard to FIG. 1, the optical fiber-based DAS 10 incorporates the HEE 12 to provide various types of communication services to coverage areas within the building infrastructure 50.

For example, as discussed in more detail below, the DAS 10 in this embodiment is configured to receive wireless RF signals and convert the RF signals into RoF signals to be communicated over the optical fiber 16 to multiple RUs 14. The optical fiber-based DAS 10 in this embodiment can be, for example, an indoor distributed antenna system (IDAS) to provide wireless service inside the building infrastructure 50. These wireless signals can include cellular service, wireless services such as RFID tracking, Wireless Fidelity (WiFi), local area network (LAN), WLAN, public safety, wireless building automations, and combinations thereof, as examples.

Figure 2B:
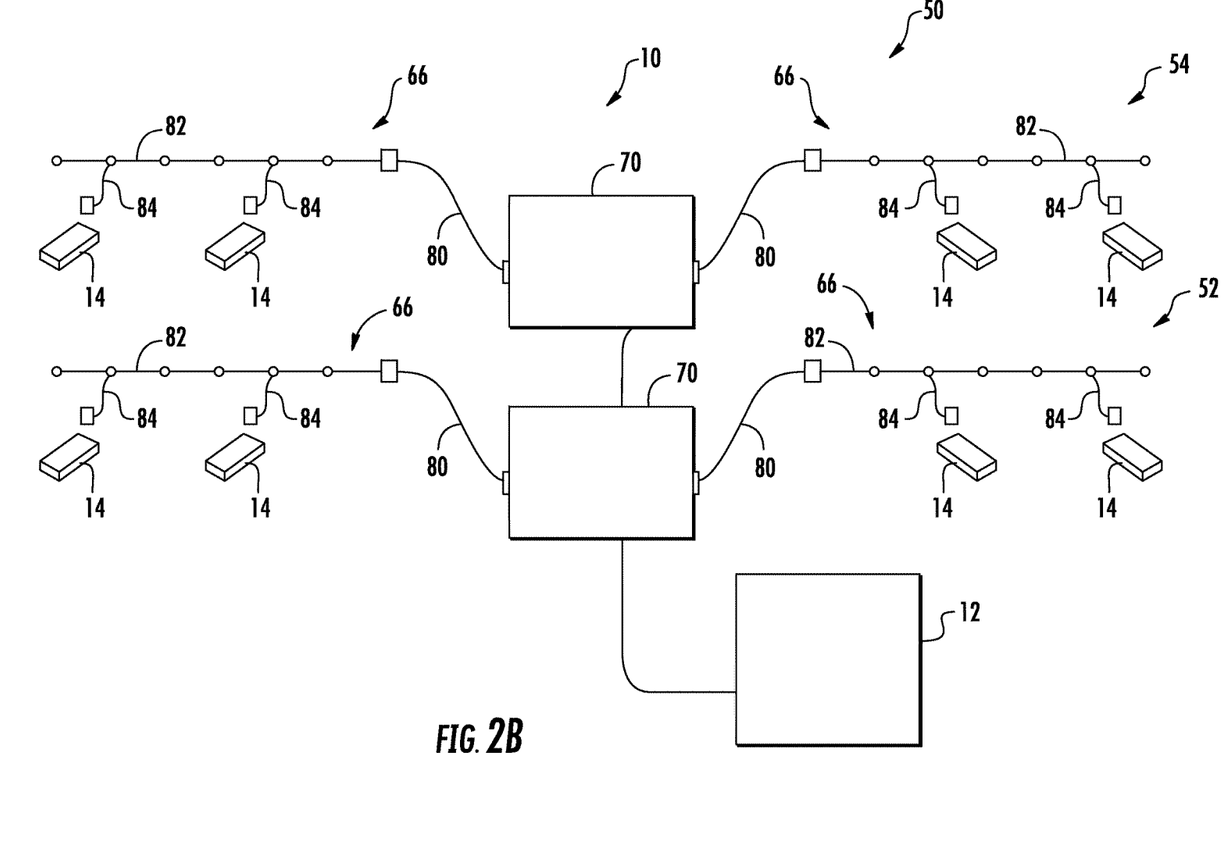
FIG. 2B is an alternative diagram of the DAS in FIG. 2A.

With continuing reference to FIG. 2A, the building infrastructure 50 in this embodiment includes a first (ground) floor 52, a second floor 54, and a third floor 56. The floors 52, 54, 56 are serviced by the HEE 12 through a main distribution frame 58 to provide antenna coverage areas 60 in the building infrastructure 50. Only the ceilings of the floors 52, 54, 56 are shown in FIG. 2A for simplicity of illustration. In the example embodiment, a main cable 62 has a number of different sections that facilitate the placement of a large number of RUs 14 in the building infrastructure 50. Each RU 14 in turn services its own coverage area in the antenna coverage areas 60. The main cable 62 can include, for example, a riser cable 64 that carries all of the downlink and uplink optical fibers 16D, 16U to and from the HEE 12. The riser cable 64 may be routed through a power unit 70. The power unit 70 may also be configured to provide power to the RUs 14 via an electrical power line provided inside an array cable 72, or tail cable or home-run tether cable as other examples, and distributed with the downlink and uplink optical fibers 16D, 16U to the RUs 14. For example, as illustrated in the building infrastructure 50 in FIG. 2B, a tail cable 80 may extend from the power units 70 into an array cable 82. Downlink and uplink optical fibers in tether cables 84 of the array cables 82 are routed to each of the RUs 14, as illustrated in FIG. 2B. Referring back to FIG. 2A, the main cable 62 can include one or more multi-cable (MC) connectors adapted to connect select downlink and uplink optical fibers 16D, 16U, along with an electrical power line, to a number of optical fiber cables 66.

With continued reference to FIG. 2A, the main cable 62 enables multiple optical fiber cables 66 to be distributed throughout the building infrastructure 50 (e.g., fixed to the ceilings or other support surfaces of each floor 52, 54, 56) to provide the antenna coverage areas 60 for the first, second, and third floors 52, 54, and 56. In an example embodiment, the HEE 12 is located within the building infrastructure 50 (e.g., in a closet or control room), while in another example embodiment, the HEE 12 may be located outside of the building infrastructure 50 at a remote location. A base transceiver station (BTS) 68, which may be provided by a second party such as a cellular service provider, is connected to the HEE 12, and can be co-located or located remotely from the HEE 12. A BTS (such as BTS 68) is any station or signal source that provides an input signal to the HEE 12 and can receive a return signal from the HEE 12.

In a typical cellular system, for example, a plurality of BTSs is deployed at a plurality of remote locations to provide wireless telephone coverage. Each BTS serves a corresponding cell and when a mobile client device enters the cell, the BTS communicates with the mobile client device. Each BTS can include at least one radio transceiver for enabling communication with one or more subscriber units operating within the associated cell. As another example, wireless repeaters or bi-directional amplifiers could also be used to serve a corresponding cell in lieu of a BTS. Alternatively, radio input could be provided by a repeater, picocell, or femtocell.

The optical fiber-based DAS 10 in FIGS. 1-2B and described above provides point-to-point communication between the HEE 12 and the RU 14. A multi-point architecture is also possible as well. With regard to FIGS. 1-2B, each RU 14 communicates with the HEE 12 over a distinct downlink and uplink optical fiber pair to provide the point-to-point communication. Whenever an RU 14 is installed in the optical fiber-based DAS 10, the RU 14 is connected to a distinct downlink and uplink optical fiber pair connected to the HEE 12. The downlink and uplink optical fibers 16D, 16U may be provided in a fiber optic cable. Multiple downlink and uplink optical fiber pairs can be provided in a fiber optic cable to service multiple RUs 14 from a common fiber optic cable.

For example, with reference to FIG. 2A, RUs 14 installed on a given floor 52, 54, or 56 may be serviced from the same optical fiber 16. In this regard, the optical fiber 16 may have multiple nodes where distinct downlink and uplink optical fiber pairs can be connected to a given RU 14.

The HEE 12 may be configured to support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

As noted above, both the HEE 12 and the RU 14 have E/O converters 28, 34, which typically include laser diodes. Laser diodes convert an electrical current into a beam of coherent light that may be used to provide optical signals. These laser diodes are designed to operate linearly over a range of currents allowing system designers to have a general idea of output power for the laser diode. The estimated output power may be used in designing the system (e.g., how long may communication paths before a repeater is needed). That is, the output power of the laser diode is designed to be proportional to the current supplied to the laser diode. However, most laser diodes are temperature sensitive such that they provide different output powers for the same current at different temperatures. It is this temperature induced variation that may cause the overall system gain to differ from a DAS, including the DAS 10 in FIG. 1, system gain approximated during system installation calibration.

Figure 3:
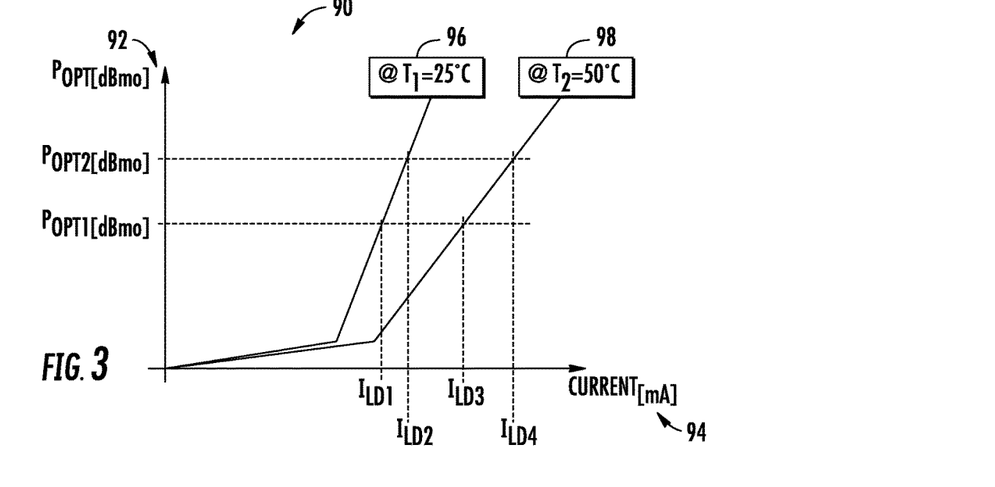
FIG. 3 is a graph showing how laser diode output power varies with temperature and current.

In this regard, FIG. 3 is an exemplary graph 90 depicting the gain of a laser diode for two different temperatures. In particular, graph 90 shows the output power 92 (y-axis) versus current 94 (x-axis) for a laser diode at a first temperature 96 (e.g., 25° C.) and a second temperature 98 (e.g., 50° C.). As can readily be seen, a given output power $P_{OPT1}$ may require a first current $I_{LD1}$ at first temperature 96, but a second current $I_{LD3}$ at second temperature 98. Likewise, a second output power $P_{OPT2}$ may require a first current $I_{LD2}$ at first temperature 96 and a second current $I_{LD4}$ at second temperature 98. In theory, to get a desired output power, the current provided to the laser diode might be varied as the temperature varied. For example, if $P_{OPT2}$ was a desired output power, the current supplied to the laser diode could change from $I_{LD2}$ to $I_{LD4}$ if the temperature increased from first temperature 96 to second temperature 98. However, in practice, power supply constraints may preclude such variations in current to the laser diode, or such variations in the current may take the laser diode out of its linear operating range. For at least these reasons, the simple activity of varying current to the laser diode is impractical.

The present disclosure accepts that variations in the current are not desired and instead provides information to a receiver about the variations in the gain of the laser diode. The DAS receiver can then compensate for the gain variations as appropriate. Exemplary structures associated with embodiments of the present disclosure are set forth with reference to FIGS. 4 and 5, which are discussed below.

Figure 4:
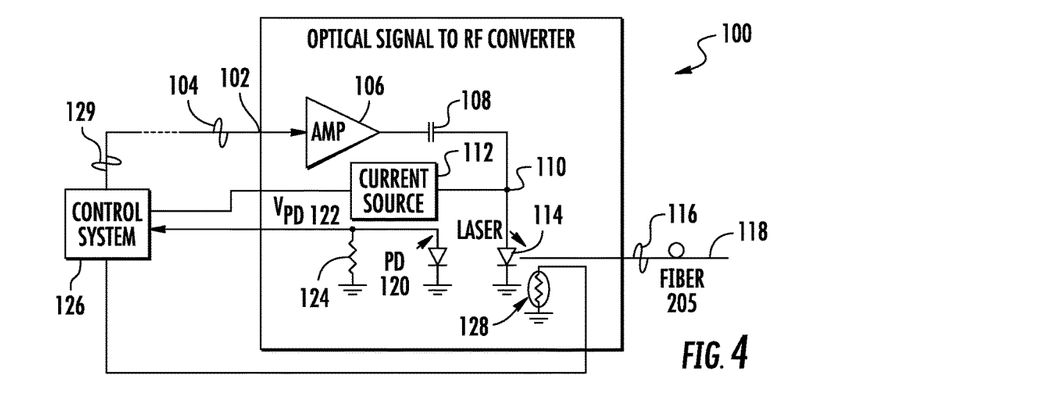
FIG. 4 is a simplified schematic diagram of a transmitter with an optical source whose slope efficiency is calculated and controlled according to an exemplary embodiment.

In this regard, FIG. 4 illustrates a transmitter 100 that may be positioned in either the HEE 12 or the RU 14. The transmitter 100 includes a control system (described in greater detail below) configured to calculate a slope efficiency of an optical source and provide control signals based on the calculated slope efficiency. In particular, the transmitter 100 includes an RF input 102 that receives an RF signal 104. The RF signal 104 is amplified by an amplifier 106. A capacitor 108 blocks direct current (DC) signals from node 110. Node 110 takes the amplified signal from the amplifier 106 and a direct current signal from current source 112 and sums the signals into a summed signal which is presented to a laser diode 114. The laser diode 114 converts the current received to an optical signal 116 which is passed to optical fiber 118, which is analogous to optical fiber 16 of FIGS. 1-2B. While the bulk of the light emitted by the laser diode 114 is transmitted through the optical fiber 118, some portion is detected by photodiode (PD) 120 which generates a voltage ($V_{PD}$) at node 122 across resistor 124. $V_{PD}$ is provided to a control system 126. Additionally a temperature sensor 128 may be associated with the transmitter 100 to measure temperature. Temperature sensor 128 is also coupled to the control system 126. The control system 126 may use data from the photodiode 120 and/or temperature sensor 128 to generate a management signal 129 that may be combined with the RF signal 104 and transmitted over the optical fiber 118. Further, the control system 126 provides a control signal to the current source 112 that instructs the current source to provide a particular direct current (DC) signal at node 110. Exemplary processes through which the transmitter 100 calculates the gain of the laser diode 114 are set forth below with reference to FIGS. 6A and 6B.

Figure 5:
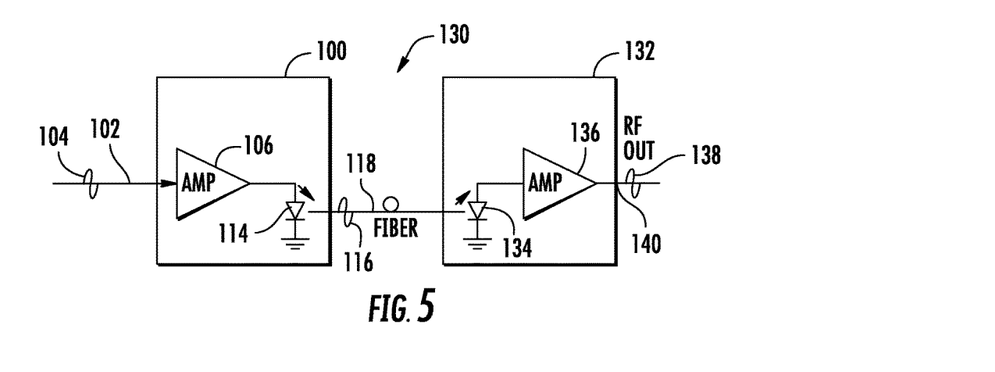
FIG. 5 is a simplified schematic diagram of a transmitter and receiver pair according to an exemplary embodiment.

FIG. 5 is a simplified view of a distributed communication system 130 with a transmitter 100 and a receiver 132. The transmitter 100 is discussed above with reference to FIG. 4 and that discussion is not repeated. The receiver 132 includes a photodiode 134 (i.e., 0/E converter 30 or 34). The output of the photodiode 134 is provided to an amplifier chain 136 (only one illustrated). The amplifier chain 136 provides an output RF signal 138 at output node 140. The amplifier chain 136 compensates for the overall gain of the system. In general, the later compensation occurs in the amplifier chain 136, the less optimal the compensation is. That is, if, for example, there are four amplifiers in the amplifier chain 136, and the compensation occurs at the third or fourth amplifier, the compensation may be distorted by the previously applied amplification of the first or second amplifier. Accordingly, it is desirable to apply the compensation earlier in the amplifier chain 136.

In this regard, the present disclosure provides techniques that allow for the gain of the optical signal source (i.e., the laser diode) to be calculated in real time. Such real time calculations do not require that the DAS discontinue normal operations. Further, such real time calculations allow effectively instantaneous corrections for environmental factors such as temperature which affect the gain of the DAS.

Figure 6A:
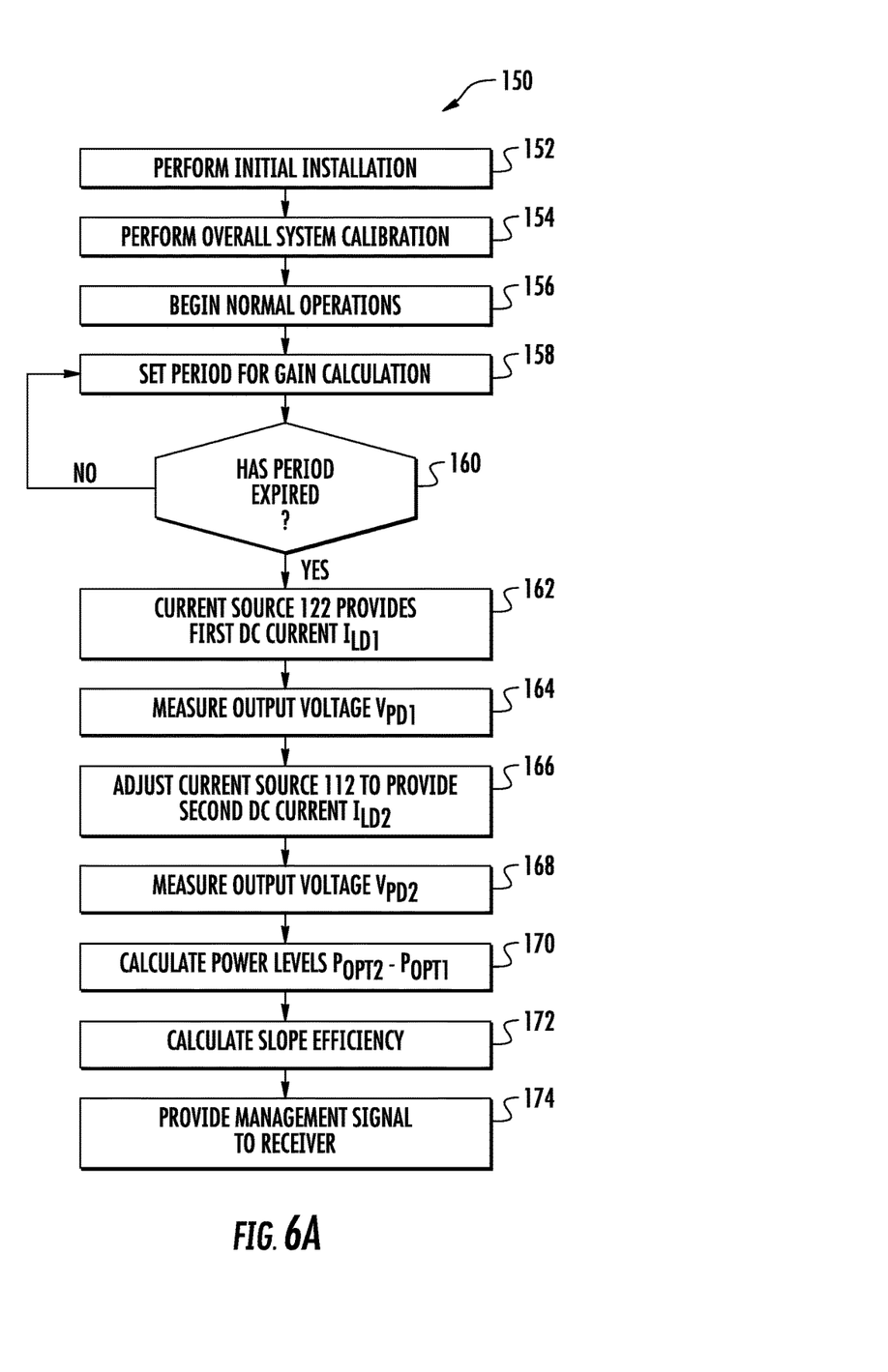
FIG. 6A is a flow chart illustrating an exemplary process of slope efficiency calculation and optical signal source control according to an exemplary embodiment.
Figure 6B:
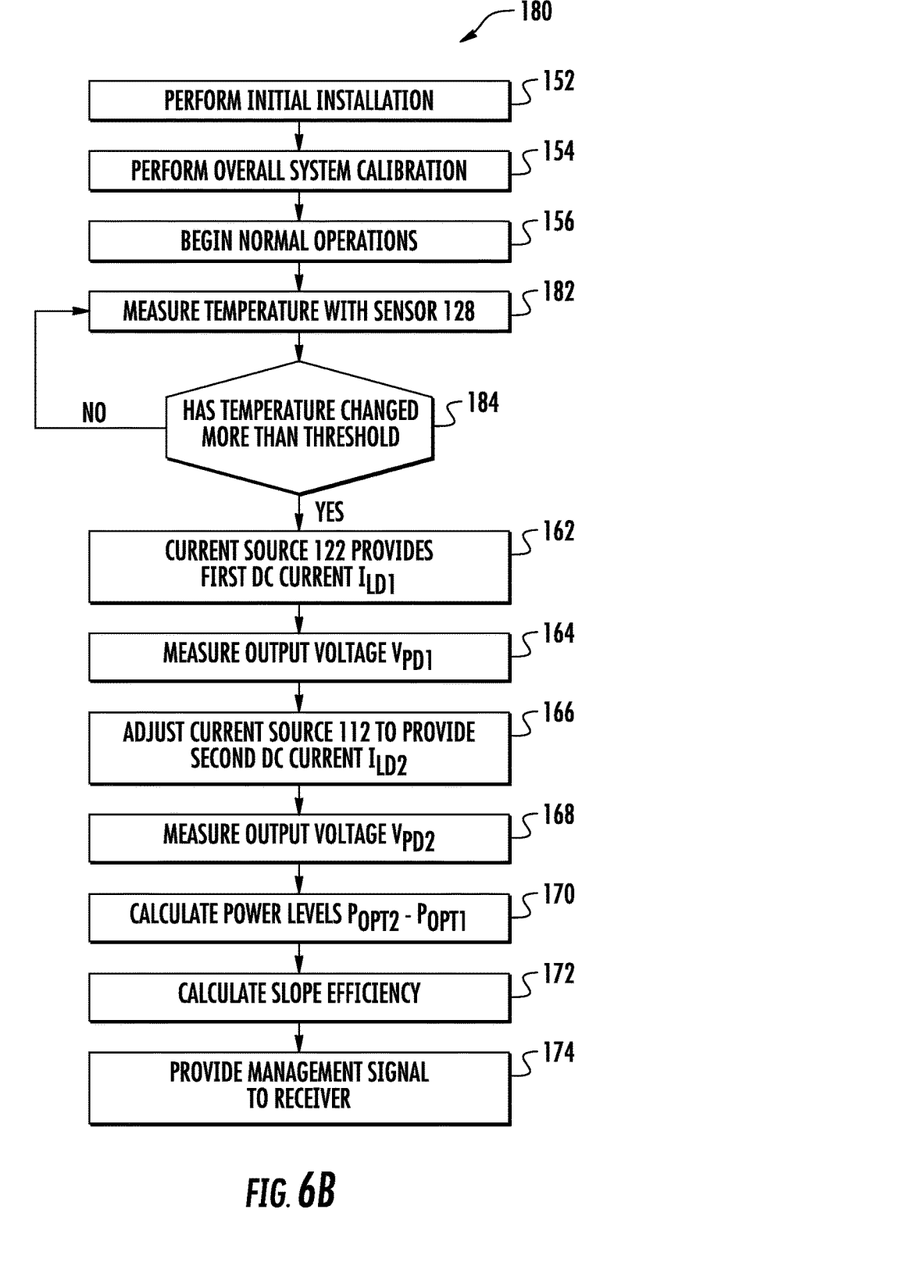
FIG. 6B is a flow chart illustrating an exemplary process of slope efficiency calculation and optical signal source control according to an alternate embodiment.

Against the backdrop of the elements presented in FIGS. 4 and 5, processes for calculating slope efficiency and control of the optical signal source according to exemplary embodiments of the present disclosure are provided with reference to FIGS. 6A and 6B. In this regard, FIG. 6A illustrates a first exemplary process 150. The process 150 begins with the initial installation of a distributed communication system 10 such as a DAS (block 152). The installation concludes with the overall system calibration of the overall system gain (block 154). Normal operations begin (block 156) with communication signals sent to and received from remote clients through the RU 14 and passed to the BTS 68 as is well understood.

The control system 126 either sets or has set a period for gain calculation (block 158). The period for gain calculation may be once a second, once a minute, or other period as needed or desired. However, environmental conditions do not typically change particularly quickly and a relatively slow period may be appropriate. The period may be set by the installation personnel, preprogrammed into the software and/or firmware of the control system during construction, or provided at a later time as needed or desired. Once the period is set and normal operations are active, the control system 126 monitors to determine if the period has expired (block 160). If the period has not expired, monitoring continues as noted. If, the period has expired, the control system 126 instructs the current source 112 to provide a first DC current $I_{LD1}$ to the node 110 and thus to the laser diode 114 (block 162). In an exemplary embodiment, the first DC current $I_{LD1}$ is approximately five milliamps (mA).

The addition of the DC current $I_{LD1}$ causes a change in the output power of the laser diode 114. Photodiode 120 receives some of the energy emitted by the laser diode 114 and generates a voltage $V_{PD1}$ across the resistor 124. The output voltage $V_{PD1}$ is measured (block 164). The control system 126 causes the current source 112 to provide a second DC current $I_{LD2}$ (block 166). In an exemplary embodiment, the second DC current $I_{LD2}$ is approximately ten mA. Other current levels may be selected as needed or desired, but a spread of five mA between $I_{LD1}$ and $I_{LD2}$ provides reliably distinct measurements. The output voltage $V_{PD2}$ is measured across the resistor 124 (block 168). From the output voltages $V_{PD1}$ and $V_{PD2}$, corresponding output power levels $P_{OPT1}$ and $P_{OPT2}$ may be calculated (block 170). With the output power levels $P_{OPT1}$ and $P_{OPT2}$ and input current levels $I_{LD1}$ and $I_{LD2}$, the control system 126 may calculate a slope efficiency (SE) (block 172) through the equation:

$$SE = \frac{P_{OPT2} - P_{OPT1}}{I_{LD2} - I_{LD1}}$$

SE is an effective measurement of the gain of the laser diode 114. Thus, changes in SE are changes in the gain of the laser diode 114. It is these environmentally induced changes in the gain of the laser diode 114 that affect the overall system gain and are not considered during the initial calibration of the system. Accordingly, once the control system 126 has the SE, the control system 126 can provide information related to the SE in the management signal 129 to the receiver 132.

In an alternate embodiment, instead of periodically calculating the SE, the SE is only calculated when the temperature has changed beyond a predefined threshold. In an exemplary embodiment, the threshold may be 2° C. Other thresholds may be used as needed or desired. FIG. 6B illustrates such alternate process 180. Process 180 is substantially similar to process 150, and many of the steps are not repeated. However, in relevant part, process 180 measures the temperature with sensor 128 (block 182). Measurements may be taken periodically or continuously. The control system 126 determines if the temperature has changed more than the predefined threshold (block 184). If the temperature has not changed sufficiently, the temperature sensor 128 continues to monitor. If the temperature has changed more than the threshold, then the control system 126 calculates SE as explained above with reference to FIG. 6A.

The processes 150 and 180 offer some tradeoffs. The use of the temperature sensor 128 requires the additional hardware of the temperature sensor 128 as well as the inputs for the control system 126 to interoperate with the temperature sensor 128. In contrast, the periodic calculations of process 150 may unnecessarily consume power if SE has not changed substantially. Such tradeoffs may be evaluated during system design.

Figure 7:
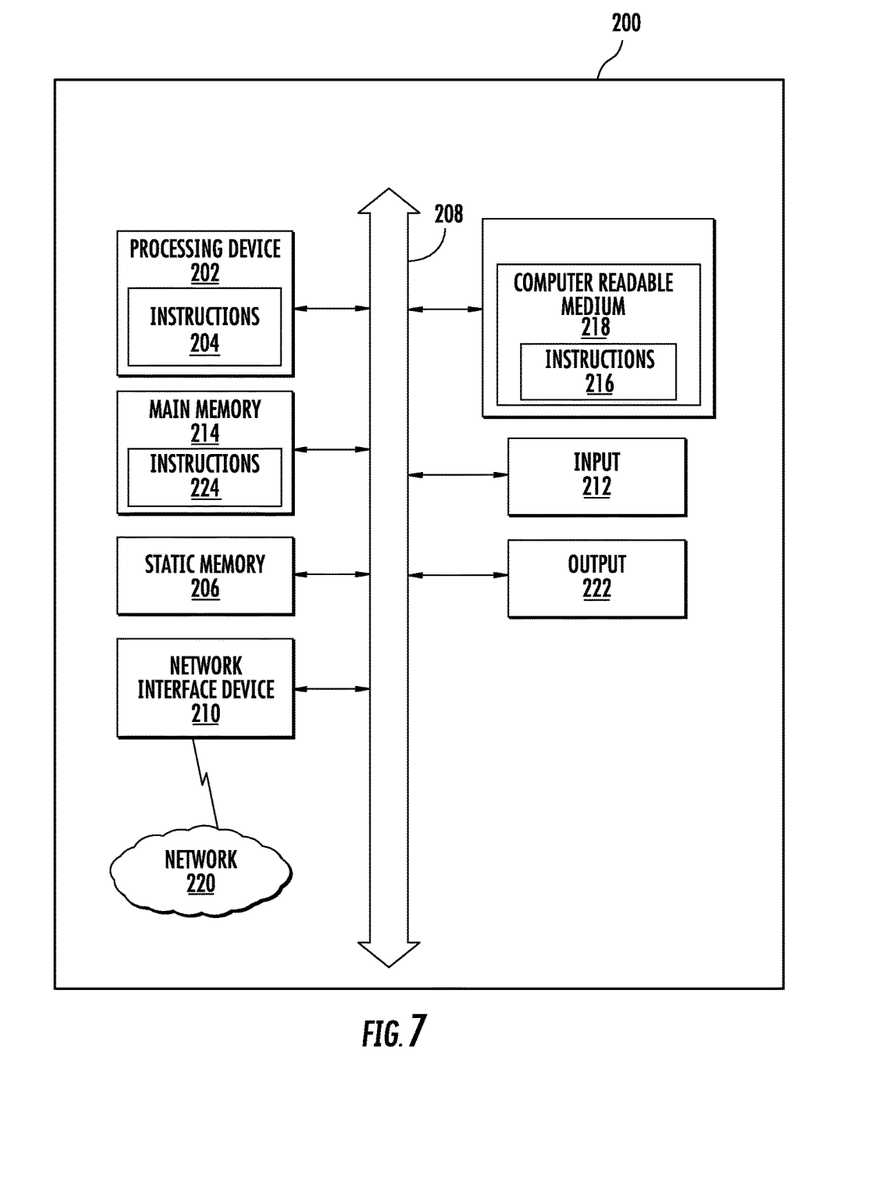
FIG. 7 is a schematic diagram of a generalized representation of an exemplary computer system that can be included in the distributed communication systems disclosed herein.

FIG. 7 is a schematic diagram representation of additional detail regarding an exemplary computer system 200 that may be included in the HEE 12 or the RU 14. The computer system 200 is adapted to execute instructions from an exemplary computer-readable medium to perform power management functions. In this regard, the computer system 200 may include a set of instructions for causing the control system 126 to calculate the SE and send the management signal 129 as previously described. The HEE 12 or RU 14 may be connected (e.g., networked) to other machines in a LAN, an intranet, an extranet, or the Internet. The HEE 12 or RU 14 may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The control system 126 may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server or a user's computer.

The exemplary computer system 200 in this embodiment includes a processing device or processor 202, a main memory 214 (e.g., read-only memory (ROM), flash memory, dynamic random access memory (DRAM) such as synchronous DRAM (SDRAM), etc.), and a static memory 206 (e.g., flash memory, static random access memory (SRAM), etc.), which may communicate with each other via the data bus 208. Alternatively, the processing device 202 may be connected to the main memory 214 and/or static memory 206 directly or via some other connectivity means. The processing device 202 may be a controller, and the main memory 214 or static memory 206 may be any type of memory.

The processing device 202 represents one or more general-purpose processing devices such as a microprocessor, central processing unit, or the like. More particularly, the processing device 202 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 202 is configured to execute processing logic in instructions 204 for performing the operations and steps discussed herein.

The computer system 200 may further include a network interface device 210. The computer system 200 also may or may not include an input 412 to receive input and selections to be communicated to the computer system 200 when executing instructions. The computer system 200 also may or may not include an output 222, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 200 may or may not include a data storage device that includes instructions 216 stored in a computer-readable medium 218. The instructions 224 may also reside, completely or at least partially, within the main memory 214 and/or within the processing device 202 during execution thereof by the computer system 200, the main memory 214 and the processing device 202 also constituting computer-readable medium 218. The instructions 216, 224 may further be transmitted or received over a network 220 via the network interface device 210.

Further, as used herein, it is intended that the terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers, bend-insensitive optical fibers, or any other expedient of a medium for transmitting light signals.

Many modifications and other embodiments of the embodiments set forth herein will come to mind to one skilled in the art to which the embodiments pertain having the benefit of the teachings presented in the foregoing descriptions and the associated drawings. For example, the DAS could include any type or number of communication mediums, including but not limited to electrical conductors, optical fiber, and air (i.e., wireless transmission).

Unless expressly stated, it is not intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, no particular order should be inferred.

Various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A distributed antenna system (DAS) configured to determine a slope efficiency of an optical signal source, comprising:
    head end equipment (HEE), comprising:
        a downlink transmitter comprising a downlink laser diode; and
        an uplink receiver configured to receive signals from a plurality of remote units (RUs);
    at least one optical fiber coupling the HEE to the plurality of RUs, each RU comprising:
        one or more antennas configured to communicate wirelessly with one or more remote clients;
        a downlink receiver communicatively coupled to the downlink transmitter through the at least one optical fiber;
        an uplink transmitter communicatively coupled to the uplink receiver through the at least one optical fiber, wherein the uplink transmitter comprises an uplink laser diode; and
    a control system associated with one of the HEE or one of the plurality of RUs, the control system configured to:
        determine a slope efficiency of the respective downlink or uplink laser diode; and
        provide slope efficiency information related to the slope efficiency to the receiver associated with the respective laser diode.

2. The DAS of claim 1, wherein the control system configured to provide information related to the slope efficiency to the receiver is configured to send a management signal to a controller associated with the receiver.

3. The DAS of claim 2, further comprising a temperature sensor associated with the control system.

4. The DAS of claim 3, wherein the control system configured to determine the slope efficiency initiates such determination based on a change in temperature reflected by output from the temperature sensor.

5. The DAS of claim 3, wherein the control system is further configured to poll the temperature sensor periodically.

6. The DAS of claim 1, wherein the control system configured to determine the slope efficiency is configured to measure a sample of optical power from the respective laser diode at a first current setting and measure a second sample of optical power from the respective laser diode at a second current setting.

7. The DAS of claim 1, wherein the control system configured to determine the slope efficiency is configured to determine the slope efficiency periodically.

8. The DAS of claim 1, wherein the control system is associated with the HEE, the respective laser diode is the downlink laser diode, and the receiver associated with the respective laser diode is the downlink receiver.

9. The DAS of claim 1, wherein the control system is associated with the one of the plurality of RU, the respective laser diode is the uplink laser diode, and the receiver associated with the respective laser diode is the uplink receiver.

10. A distributed communication system, comprising:
    head end equipment (HEE) comprising:
        a downlink transmitter comprising a downlink laser diode;
        an uplink receiver configured to receive signals from a plurality of remote units (RUs); and
        a control system configured to:
            determine a slope efficiency of the downlink laser diode; and
            provide information related to the slope efficiency to one of the plurality of RUs.

11. A method of compensating for variations in laser diode performance in a distributed communication system, the method comprising:
    determining a slope efficiency of a transmitter's laser diode;

providing information relating to the slope efficiency to a receiver in the distributed communication system; and adjusting a link gain at the receiver based on the information relating to the slope efficiency.

12. The method of claim 11, wherein adjusting the link gain occurs in substantially real time during active communication by the distributed communication system.

13. The method of claim 11, wherein determining the slope efficiency comprises periodically determining the slope efficiency.

14. The method of claim 11, wherein determining the slope efficiency comprises measuring a temperature at the laser diode and determining the slope efficiency if the temperature has changed more than a threshold amount compared to a previously recorded temperature.

15. The method of claim 11, wherein adjusting the link gain at the receiver comprises adjusting the link gain in a radio frequency (RF) amplifier.

16. The method of claim 11, wherein determining the slope efficiency comprises:

measuring a first current level;

measuring a first output power from the laser diode at the first current level;

adjusting a current source to a second current level; and measuring a second output power from the laser diode at the second current level.

17. The method of claim 11, wherein providing information relating to the slope efficiency to the receiver in the distributed communication system comprises sending the information in a management signal.

18. The method of claim 11, wherein the laser diode is in head end equipment (HEE).

19. The method of claim 11, wherein the laser diode is in a remote unit (RU).

* * * * *